(12) United States Patent
Jones

(10) Patent No.: US 7,835,507 B2
(45) Date of Patent: Nov. 16, 2010

(54) TELEPHONE SERVICE INTERFACE

(75) Inventor: Robert Norman Jones, San Antonio, TX (US)

(73) Assignee: Time Warner Cable Inc., New York, NY (US)

( * ) Notice: Subject to any disclaimer, the term of this patent is extended or adjusted under 35 U.S.C. 154(b) by 1132 days.

(21) Appl. No.: 11/503,466

(22) Filed: Aug. 11, 2006

(65) Prior Publication Data
US 2008/0020648 A1 Jan. 24, 2008

Related U.S. Application Data

(60) Provisional application No. 60/831,824, filed on Jul. 19, 2006.

(51) Int. Cl.
*G08B 21/00* (2006.01)
*G01R 33/00* (2006.01)
(52) U.S. Cl. .................. 379/93.08; 340/653; 379/90.01; 439/638
(58) Field of Classification Search ............ 379/413.02, 379/413.03, 413.04; 340/653, 652, 310.03
See application file for complete search history.

(56) References Cited

U.S. PATENT DOCUMENTS 6,404,347 B1 * 6/2002 Kiko .......................... 340/653
6,570,965 B1 * 5/2003 Isely et al. ............... 379/93.07
6,848,009 B2 * 1/2005 Pascolini .................... 709/250
2005/0259810 A1 * 11/2005 Cooke .................... 379/413.04

OTHER PUBLICATIONS

PR Newswire, Press Release, "Terayon Introduces Embedded Media Terminal Adapter for delivery of Combined Voice and Data Services Over Cable Networks", Nov. 27, 2001, pp. 1-4, www.highbeam.com/doc/1G1-80559740.html, Accessed Jan. 4, 2010.*
Dual Telephone Line Surge Supressor, ELK-955, ELK Products Inc, www.elkproducts.com, PO Box 100, Hildebran, NC 28637, Aug. 2002, pp. 1-2, Accesed Jan. 4, 2010.*

* cited by examiner

*Primary Examiner*—Ahmad F Matar
*Assistant Examiner*—Kharye Pope
(74) *Attorney, Agent, or Firm*—The Marbury Law Group, PLLC

(57) ABSTRACT

A telephone service interface (TSI) for accessing a network connection from the subscriber side of a network interface device. A TSI modular plug is adapted to mate with the security monitoring system jack. The TSI jack is connected to a TSI modular plug via first and second conductors. The first conductor establishes a first circuit between contact 1 on the TSI modular plug and contact 1 on the TSI jack and wherein the second conductor establishes a second circuit between contact 8 on the TSI modular plug and contact 8 on the TSI jack. First and second leads are connected to contact 4 and contact 5 of the TSI jack. The TSI jack receives the security monitoring system connection plug from the security monitoring system. The security monitoring system is connected to the telephone service provider network NID via contacts 4 and 5 of the security monitoring system connection plug.

10 Claims, 3 Drawing Sheets

TELEPHONE SERVICE INTERFACE

CROSS REFERENCE TO RELATED APPLICATIONS

This application claims the benefit under 35 U.S.C. §119 (e) of provisional application No. 60/831,824 filed Jul. 19, 2006. The 60/831,824 provisional application is incorporated by reference herein, in its entirety, for all purposes.

BACKGROUND

The present invention relates to electrical connectors and more particularly to access to telephone system wiring through the subscriber side of a network interface device.

Telephone companies (or "telcos") typically maintain telephone wiring up to a demarcation point where the telco feed interfaces with the house or premises wiring. The demarcation point is located in a network interface device (NID). The NID has two "sides"—one for the phone company and one for subscriber access. At least the telco-side of the NID terminates in a modular test jack. The test jack comprises normally closed shorting bars that connect inside wiring to the telco feed when no plug is inserted into the test jack. When a plug is inserted into the test jack, the telco feed is disconnected from the inside wiring. In this way, a telephone known to be in working order can be used to test the telco feed while isolating the inside wiring.

Competition for local telephone service subscribers is growing. Broadband service providers offer digital telephone service, which turns voice calls into digital packets for dispatch over a managed IP network. A cable company can now offer cable TV, telephone service and broadband connections on one bill to its subscribers. Other non-telco service providers may provide local telephone service to subscribers using existing inside wiring.

By way of illustration, when a cable subscriber elects to convert from telco-provided local phone service to cable-provided local service, the inside wiring is connected through a cable voice interface device to the cable provider's network. Typically, a cable modem that is either connected to a media terminal adapter (MTA) or is integrated with an MTA is connected to the inside wiring through a wall jack. This installation procedure is sometimes referred to as "backfeeding." To isolate the cable equipment from the telco feed, the telco feed is disconnected from the inside wiring. Where a NID of the type described above has been provided, the telco feed at the telco side of the NID must be removed or a plug inserted into the test jack.

A modern NID typically has a security monitoring system jack on the subscriber side that allows for the connection of a security monitoring system. An RJ31X jack is commonly used to make this connection.

Typically, the RJ31X jack accepts an eight-conductor RJ45 plug provided by the alarm system provider. FIG. 1 illustrates the wiring configuration of an RJ31X jack 100 as known in the prior art. The telco feed 102 uses contacts 4 and 5 while the inside wiring 104 is connected to contacts 1 and 8. Shorting bars 106A and 106B connect contact J1 to contact J4 and contact J5 to contact J8 when no plug 120 is inserted into jack 100. The insertion of plug 120 into jack 100 causes the shorting bars 106A and 106B to disconnect thus interposing the security system (not illustrated) between the telco feed 102 and the inside wiring 104. During non-emergency conditions, the security system completes the circuits between contacts 1 and 4 and 5 and 8. However, in the event an alarm condition arises, the security system disconnects the inside wiring 104 from the telco feed 102 and "seizes" the telco feed 102 to transmit security data.

The removal of the telco input and the connection of an MTA (not illustrated) to the inside wiring 104 via a wall jack establishes the MTA as the "new" network interface device to the cable system provider network. Where the cable subscriber has a security monitoring system connected to the telco feed through the RJ31X, the "backfeeding" method of installation does not provide a viable connection to the RJ31X alarm network connection point. When an emergency occurs, the security system automatically disconnects from the inside wiring 104 and but has no path through the MTA to the cable system provider's network.

It is possible to avoid this problem by connecting the MTA to the telco feed side of the RJ31X jack (after the telco feed has been disconnected from the inside wiring). Such a connection would establish a connection between the MTA and the network side of the security system. However, there may be legal issues associated with accessing this connection point that make this solution untenable for the cable operator. What is needed is an inexpensive means for connecting an MTA to the network side of a security alarm system without accessing the telco side of the NID while isolating the telco feed from the cable network.

SUMMARY

In an embodiment of the present invention, a telephone service interface (herein, a "TSI") comprises a TSI RJ31X jack and a TSI RJ45 plug connected via a length of CAT5 cable. Contacts 1 and 8 of the TSI RJ31X jack are connected to contacts 1 and 8 of the TSI RJ45 plug. Contacts 4 and 5 of the TSI RJ31X jack are connected to separate leads, sometimes referred to herein as a "twisted pair." In an embodiment of the present invention, the separate leads comprise a length of 24AWG twisted pair wire. The leads are connected to a spare wiring pair from the MTA phone jack location present at one of the subscriber's phone outlet connection points in the right side of the NID.

The TSI RJ45 plug is inserted into an RJ31X jack located on the subscriber's side of the network interface device (NID). This insertion of the TSI RJ45 plug into the NID RJ31X jack breaks the circuits formed by the shorting bars (see 106A and 106B, FIG. 1). Because the TSI RJ45 plug has no connections to contacts 4 and 5 of the NID RJ31X jack, which are connected to the telco feed (see 102, FIG. 1), the telco feed is isolated from the inside wiring. When no plug is inserted into the TSI RJ31X jack, contacts 4 and 5 of the TSI RJ31X jack are connected to contacts 1 and 8 of the TSI RJ31X respectively via shorting bars and to the inside wiring via contacts 1 and 8 of NID RJ31X jack. The twisted pair connected to contacts 4 and 5 of the TSI RJ31X jack are connected to an MTA thus providing cable telephone service through the inside wiring without access to the telco feed.

If the subscriber elects to secure monitored alarm service, the TSI RJ31X receives a security system plug from a security system (not illustrated). In an embodiment of the present invention, the security system plug is a security system RJ45 plug. When the TSI RJ31X jack receives the security system plug, shorting bars within the TSI RJ31X jack are opened. The security system is thereby connected to the inside wiring of the dwelling (using contacts 1 and 8). The network side of the security system is also connected to the twisted pair connected to contacts 4 and 5 of the TSI RJ31X. The twisted pair is then connected to a media terminal adapter (MTA) by way of a spare wire pair from the MTA connection point which is then connected to the cable network. In this configuration, the security system provides connectivity of the inside wiring to the MTA during non-emergency conditions. When an emergency is detected by the security system, the inside wiring is disconnected from the MTA and the security system "seizes" the MTA and connects to the cable network for reporting security-related data to the alarm service monitoring center.

In yet another embodiment of the present invention, the TSI RJ45 plug is inserted into an RJ31X jack located on the subscriber's side of the network interface device (NID) even where the subscriber has not elected to secure monitored alarm service. In this configuration, the TSI RJ31X jack is available for the installation of an alarm without further wiring to the NID and without modification of the cable telephone service installation. In this "alarm-ready" configuration, the TSI provides a security alarm installer access to the inside wiring and the cable provider's network without requiring an additional service call to the premises by the cable provider.

It is therefore an aspect of the present invention to provide a connection of a security system to a cable telephone service connection without access to the telco side of a network interface device.

It is another aspect of the present invention to allow the installation of a cable telephone service connection in a dwelling having an alarm system without disabling the alarm's ability to communicate with an alarm service provider.

It is yet another aspect of the present invention to reduce the cost of installation and maintenance of cable telephone service by eliminating the need to interact with the telco service provider regarding access to the telco side of a NID.

It is still another aspect of the present invention to provide an "alarm-ready" access point in a cable telephone service environment so as to eliminate the need for additional support resources by the cable service provider when an alarm monitoring service is installed after the installation of cable telephone service.

DETAILED DESCRIPTION

Figure 2:
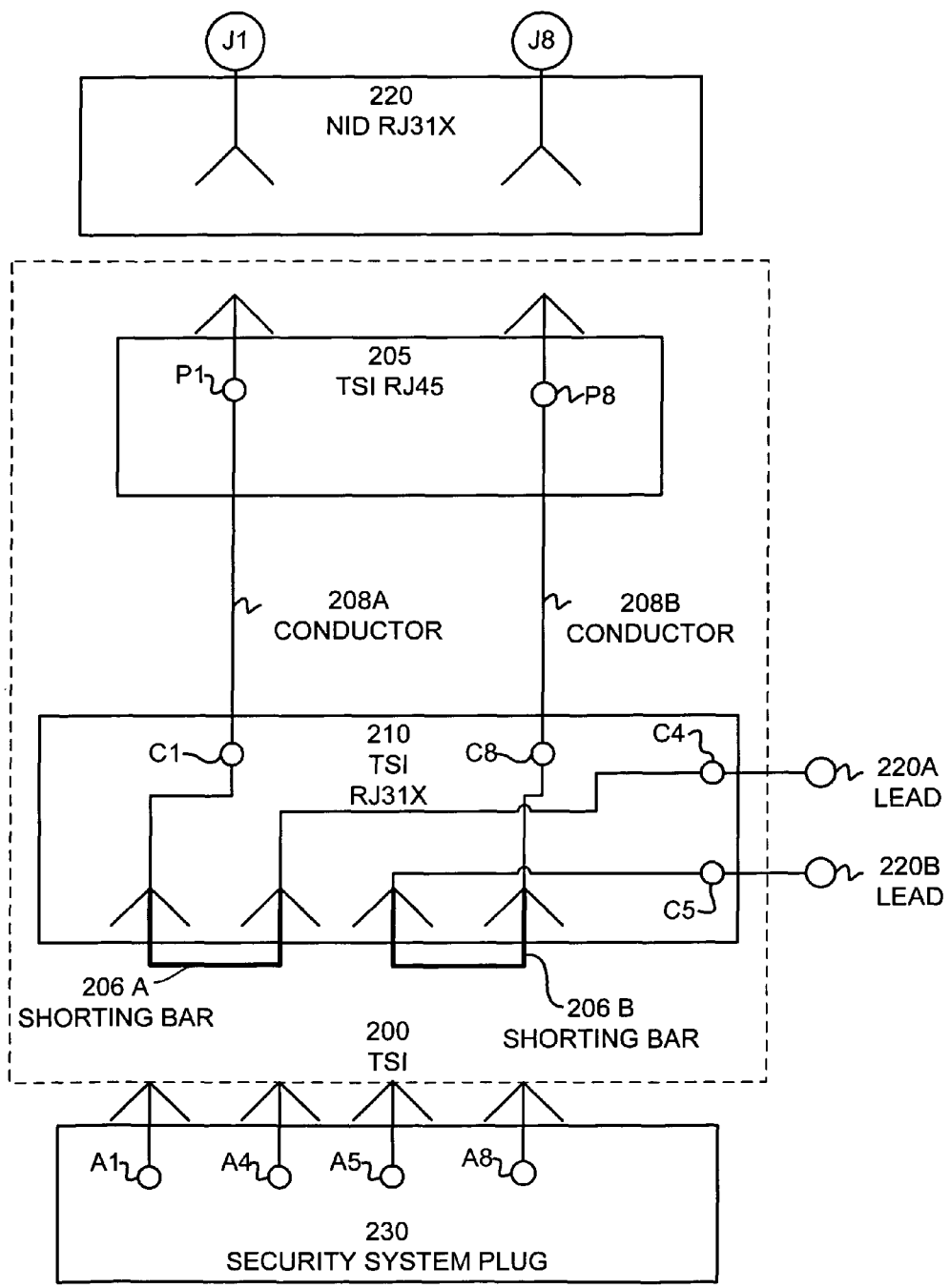
FIG. 2 illustrates a telephone service interface according to an embodiment of the present invention.

FIG. 2 illustrates a telephone service interface (herein, a "TSI") according to an embodiment of the present invention. For clarity, only the contacts that are used by the TSI are illustrated.

In an embodiment of the present invention, TSI 200 comprises a TSI RJ45 plug 205 connected to a TSI RJ31X jack 210. In an embodiment of the present invention, TSI RJ45 plug 205 and TSI RJ31X jack 210 are connected via conductors 208A and 208B. In an embodiment of the present invention, conductors 208A and 208B are a length of CAT5 cable. Contacts P1 and P8 of the TSI RJ45 plug 205 are connected to contacts C1 and C8 of the TSI RJ31X jack 210 via conductors 208A and 208B. Contacts C4 and C5 of the TSI RJ31X jack 210 are connected to leads 220A and 220B.

Figure 1:
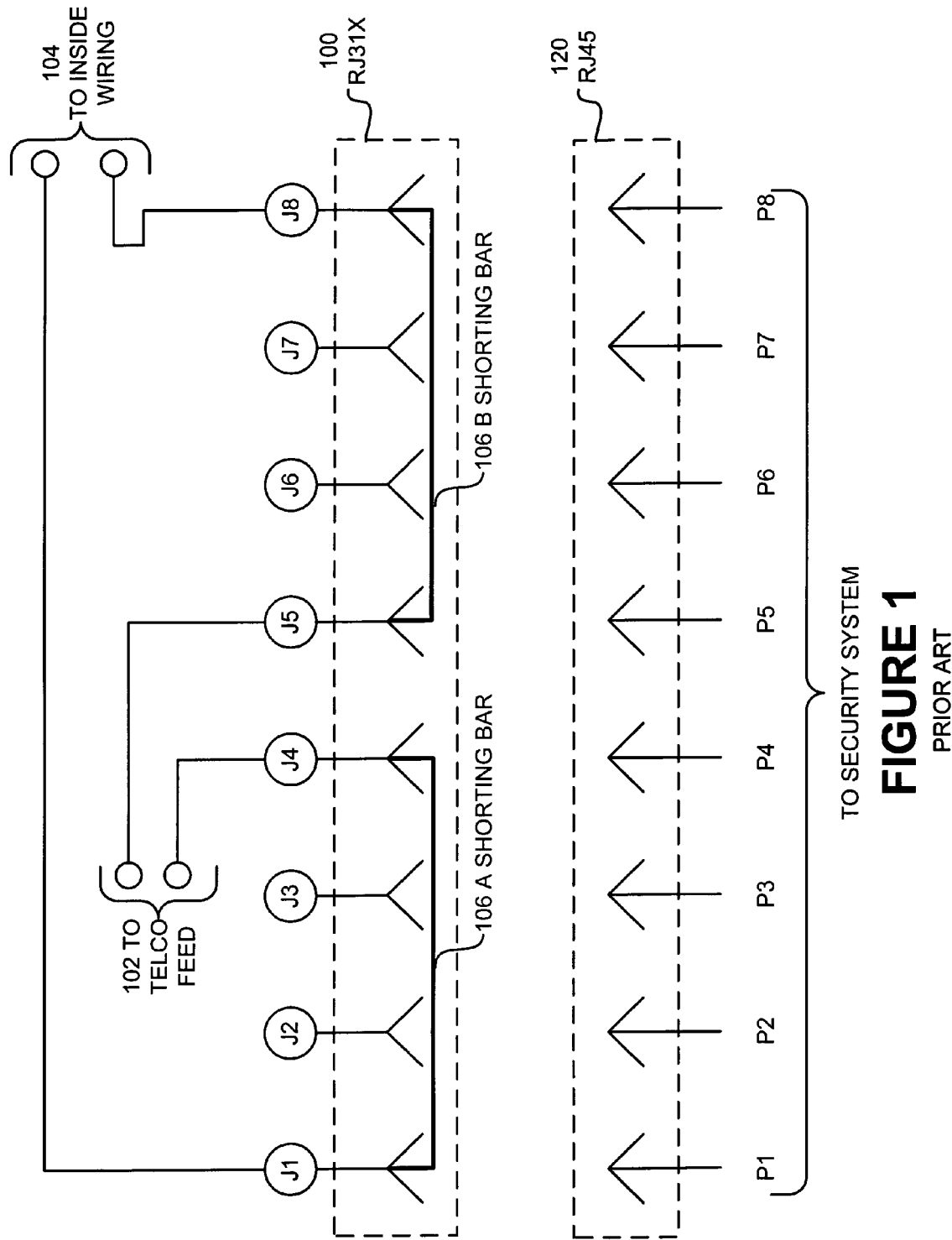
FIG. 1 illustrates the connection of security system to a telephone network interface device (NID) according to the prior art.

The TSI RJ45 plug 205 is inserted into NID RJ31X jack 220 on a network interface device (NID). This insertion of the TSI RJ45 plug 205 into the NID RJ31X jack 220 breaks the circuits formed by the shorting bars (see 106A and 106B, FIG. 1) between contacts J1 and J4 and between J5 and J8 (see FIG. 1) of NID RJ31X jack 220. Because the TSI RJ45 plug 205 has no connections to contacts 4 and 5 (not illustrated) of the NID RJ31X jack 220, which contacts are connected to the telco feed (see 102, FIG. 1), the telco feed 102 is isolated from the inside wiring (see 104, FIG. 1). When no plug is inserted into the TSI RJ31X jack 210, contacts C4 and C5 of TSI RJ31X jack 210 are connected to contacts C1 and C8 of TSI RJ31X jack 210 respectively via shorting bars 206A and 206B respectively and to the inside wiring via contacts J1 and J8 of NID RJ31X jack 220. The twisted pair connected to contacts C4 and C5 of the TSI RJ31X jack 210 are connected to an MTA (not illustrated) thus providing cable telephone service through the inside wiring without access to the telco feed.

If the subscriber elects to secure monitored alarm service, the TSI RJ31X jack 210 receives a security system plug 230 from a security system (not illustrated). In an embodiment of the present invention, the security system plug 230 is a security system RJ45 plug. This insertion of the security system plug 230 into the TSI RJ31X jack 210 breaks the circuits formed by shorting bars 206A and 206B. The security system is connected to the inside wiring of a dwelling through contacts P1 and P8 of the TSI RJ45 plug 205, contacts C1 and C8 of the TSI RJ31X jack 210, and conductors 208A and 208B. The network side of the security system is also connected to leads 220A and 220B connected to contacts C4 and C5 of the TSI RJ31X 210. Leads 220A and 220B are connected to a media terminal adapter (MTA) (not illustrated) which is then connected to the cable network. In this configuration, the security system provides connectivity between the inside wiring and the MTA during non-emergency conditions. When an emergency is detected by the security system, the inside wiring is disconnected from the MTA and the security system "seizes" the MTA and connection to the cable network for reporting security-related data to the alarm service monitoring center.

In an embodiment of the present invention, the MTA comprises a cable modem. In another embodiment of the present invention, the MTA connects to the cable network via a discrete cable modem. In yet another embodiment of the present invention, the MTA is connected to the twisted pair via a wall jack connected to a "spare" pair of the inside wiring not used to connect to telephones or other equipment.

In an embodiment of the present invention, a TSI is used to provide an "alarm-ready" access point in a cable telephone service environment so as to eliminate the need for additional support resources by the cable service provider when an alarm monitoring service is installed after the installation of cable telephone service.

In yet another embodiment of the present invention, a TSI provides access to the network side of a security monitoring system for the installation of telephone services provided by a competitive local exchange carrier (CLEC) via a CLEC-provided network.

Figure 3:
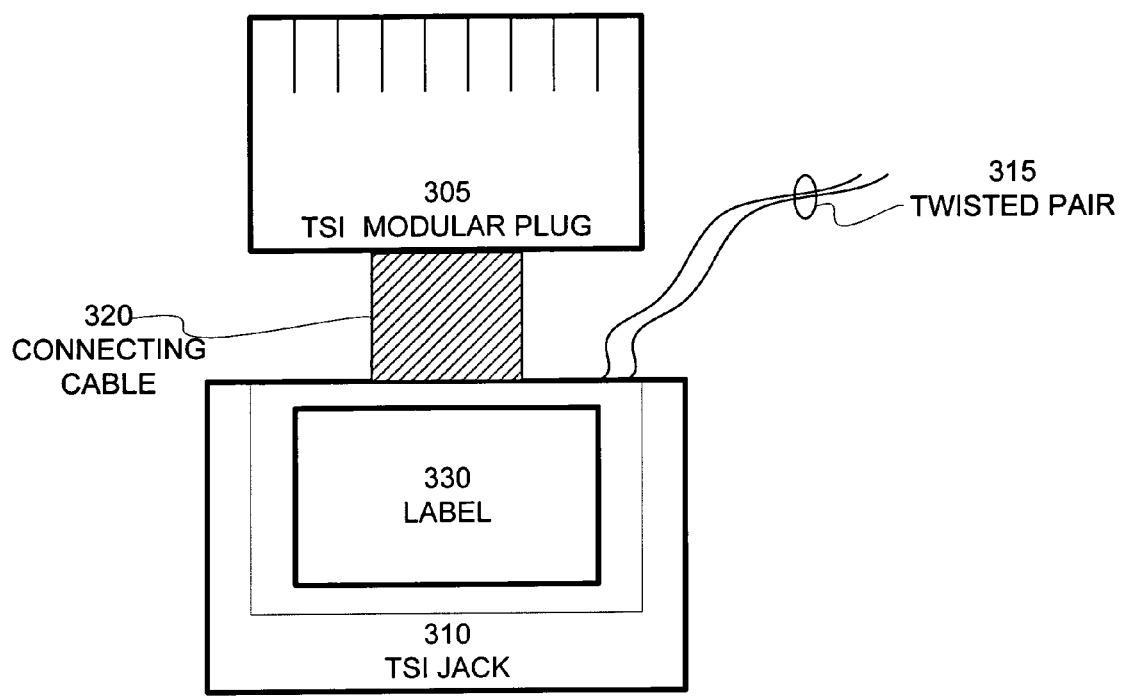
FIG. 3 illustrates a block diagram of a telephone service interface according to an embodiment of the present invention.

FIG. 3 illustrates a block diagram of a telephone service interface according to an embodiment of the present invention. TSI modular plug 305 is connected to TSI jack 310 via cable 320. Twisted pair 315 extends from TSI jack 310. A label 330 is affixed to TSI jack 310. According to an embodiment of the present invention, the label comprises text identifying the TSI jack 310 as the appropriate connection point for a security monitoring system.

A telephone service interface been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

I claim:

1. An assembly for connecting telephone service equipment to a network side of a security monitoring system comprising:
   a telephone service interface (TSI) modular plug adapted for mating with a security monitoring system jack on a network interface device (NID), wherein a first side of the NID is connected to a telephone network and a second side of the NID is connected to an inside wiring system, wherein the NID comprises the security monitoring system jack and wherein the telephone network is connected to contacts four and five of the security monitoring system jack and wherein the inside wiring system is connected to contacts one and eight of the security monitoring system jack;
   a TSI jack, wherein the TSI jack is connected to the TSI modular plug via first and second conductors, wherein the first conductor establishes a first circuit between contact one on the TSI modular plug and contact one on the TSI jack, wherein the second conductor establishes a second circuit between contact eight on the TSI modular plug and contact eight on the TSI jack, wherein contact four and contact five of the TSI modular plug remain open and wherein when the TSI modular plug is mated with the security monitoring system jack on the NID, the inside wiring system is connected to contacts one and eight of the TSI modular plug and the TSI jack and wherein the telephone network is isolated from the TSI modular plug and the TSI jack; and
   first and second leads, wherein the first lead is connected to contact four of the TSI jack and the second lead is connected to contact five of the TSI jack, wherein when the TSI jack is mated with a security monitoring system connection plug from a security monitoring system, the first and second leads are connected to the network side of the security monitoring system via contacts four and five of the security monitoring system connection plug and to a telephone service equipment.

2. The assembly of claim 1, wherein the TSI modular plug and the security monitoring system plug are RJ-45-type modular plugs.

3. The assembly of claim 1, wherein the security monitoring system jack and the TSI jack are RJ31X-type jacks.

4. The assembly of claim 1, wherein the first and second conductors are components of a CAT5 cable.

5. The assembly of claim 1, wherein the TSI jack comprises a label identifying the TSI jack as a connecting point to the security monitoring system.

6. A method of connecting telephone service equipment to a network side of a security monitoring system from a subscriber side of a network interface device (NID) wherein a first side of the NID is connected to a telephone network and a second side of the NID is connected to an inside wiring system, wherein the NID comprises a security monitoring system jack and wherein the telephone network is connected to contacts four and five of the security monitoring system jack and wherein the inside wiring system is connected to contacts one and eight of the security monitoring system jack:
   removing a security monitoring system connection plug connected to a security monitoring system from a security monitoring system jack located on the NID;
   inserting a telephone service interface (TSI) modular plug in the security monitoring system jack and inserting the security monitoring system connection plug into a TSI jack, wherein the TSI jack is connected to the TSI modular plug via first and second conductors, and wherein the first conductor establishes a first circuit between contact one on the TSI modular plug and contact one on the TSI jack and wherein the second conductor establishes a second circuit between contact eight on the TSI modular plug and contact eight on the TSI jack and wherein contact four and contact five of the TSI modular plug remain open and wherein when the TSI modular plug is mated with the security monitoring system jack on the NID, the inside wiring system is connected to contacts one and eight of the TSI modular plug and the TSI jack and wherein the telephone network is isolated from the TSI modular plug and the TSI jack;
   connecting a first lead to contact four of the TSI jack and a second lead to contact five of the TSI jack, wherein contacts four and five of the security monitoring system connection plug connect to the network side of the security monitoring system; and
   connecting telephone service equipment to the network side of the security monitoring system via the first and second leads.

7. The method of claim 6, wherein the TSI modular plug and the security monitoring system plug are RJ-45-type modular plugs.

8. The method of claim 6, wherein the security monitoring system jack and the TSI jack are RJ31X-type jacks.

9. The method of claim 6, wherein the first and second conductors are components of a CAT5 cable.

10. The method of claim 6, wherein the telephone service equipment comprises a media terminal adapter.

* * * * *